United States Patent [19]
Martell

[11] 3,786,423
[45] Jan. 15, 1974

[54] APPARATUS FOR CUMULATIVELY STORING AND REMOTELY READING A METER

[75] Inventor: Dennis J. Martell, West Chicago, Ill.

[73] Assignee: Northern Illinois Gas Company, Aurora, Ill.

[22] Filed: Jan. 24, 1972

[21] Appl. No.: 220,015

[52] U.S. Cl.................. 340/151, 340/183, 340/204, 340/180
[51] Int. Cl............................................. G08c 19/16
[58] Field of Search...................... 340/204, 203, 151

[56] References Cited
UNITED STATES PATENTS

| | | | |
|---|---|---|---|
| 3,170,150 | 2/1965 | Kelar | 340/151 |
| 3,313,160 | 4/1967 | Goldman | 340/204 |
| 3,656,112 | 4/1972 | Paull | 340/151 |
| 3,392,378 | 7/1968 | Perry | 340/204 |
| 3,467,889 | 9/1969 | Brough | 340/204 |
| 3,685,031 | 8/1972 | Cook | 340/204 |

Primary Examiner—Thomas B. Habecker
Attorney—Howard W. Clement and Jack C. Berenzweig

[57] ABSTRACT

There is disclosed a method and an apparatus for remotely reading one or more meters containing information which are located in a station remote from a central location. The apparatus comprises a means for producing a plurality of information signals indicative of the information being registered on the meter; a means for accumulating the information signals; a means for interrogating the accumulator means wherein a plurality of individual output data bits, each of which are representative of one of the digits of information registered on the meter, are provided; a means for converting these output data bits to a frequency coded signal wherein the frequency coded signal is representative of the magnitude of each of the output data bits; and a means for sequentially transmitting the frequency coded signals to the central office location, thereby enabling each of the digits of information registered on the meter to be read.

15 Claims, 7 Drawing Figures

| INPUT BCD | OUTPUT 2/5 | | | | | | | | | |
|---|---|---|---|---|---|---|---|---|---|---|
| | 0 | 1 | 2 | 3 | 4 | 5 | 6 | 7 | 8 | 9 |
| 0 | | X | X | | X | | | X | | |
| 1 | | X | | X | | X | | | X | |
| 2 | | | X | X | | | X | | | X |
| 4 | X | | | | X | X | X | | | |
| 7 | X | | | | | | | X | X | X |

APPARATUS FOR CUMULATIVELY STORING AND REMOTELY READING A METER

BACKGROUND OF THE INVENTION

The present invention relates to improvements in metering and more particularly, to a method and apparatus for automatically reading remotely located meters, such as utility meters, from a central station.

Public utility systems that supply services, such as gas, electricity, and water, generally provide at each customer's location a meter measuring the amount of the particular commodity that is being consumed. In order to bill each customer for the services provided, utility systems typically employ a number of persons to visit each meter periodically and to visually read the amount of service consumed. Since the number of individual customers receiving the above services in a given locality is ordinarily quite large, the employment of sufficient persons to read the meters in this fashion involves a considerable expense on the part of the local utility systems. In addition, there is always a small but significant number of meters which are not accessable at any given time, thereby requiring additional visits by meter reading employees and further increasing the expense of reading meters.

Several systems have been devised in an attempt to read these utility meters remotely from a central station. Many of these systems are extremely expensive to implement and are not at all accurate. Furthermore, these several prior art systems are totally dependent upon AC power to read the meters and in the case of a loss of power, due to a power failure, all electronic information from the meter is destroyed. The present invention fulfills the need for a method and apparatus to remotely read meters from a central station while eliminating the difficulties previously encountered.

SUMMARY OF THE INVENTION

The general purpose of this invention is to provide an inexpensive apparatus for remotely reading a meter from a central location and which may be manufactured using integrated circuits. To attain this, the present invention contemplates mounting a switch or other means for producing a plurality of information signals on the meter itself wherein the switch produces electrical pulses indicative of the information being registered on the meter. This information is supplied to an accumulator which is powered by a DC power source. The advantage of using a DC power source is that the accumulated count would not be lost if there were to be a power failure. The power for the remainder of the system is supplied externally. One accumulator would be utilized for each meter being monitored. A single control section is provided which is used to interrogate each of the accumulators. The control section would operate a plurality of select gates to sequentially select the information in each of the accumulators representative of digits of the meter readings in the form of output data bits. To add to the accuracy, the output data bits from the accumulators could be converted to a code, such as a two out of five code. The output data bits are then placed into a shift register and are sequentially shifted out into an FSK oscillator where they are frequency encoded and are transmitted via the telephone lines to the central location. After an individual accumulator has been interrogated, two additional readings may be sent, one an identification reading indicative of the meter being monitored and second, a status signal information indicative of the status of a preselected switch which may be used to indicate the existence or absence of proper cathodic protection.

It is, therefore, an object of the present invention to provide a remote meter reading apparatus which is less expensive than sending a meter reader to visit the home of a utility customer.

Another object is to provide a meter reading apparatus which utilizes a conventional telephone system for transmitting signals representing the information shown on the meter from the remote meter to a central station.

A further object is to provide an apparatus for remotely reading a meter which will not lose its accumulated information due to a power failure.

Still another object is to provide an apparatus for remotely reading a meter which may be made from integrated circuit chips.

Other objects and many of the attendant advantages of this invention will be readily appreciated as the same becomes better understood by reference to the following detailed description when considered in connection with the accompanying drawings and which like reference numerals designate like parts throughout the several views.

DESCRIPTION OF THE PREFERRED EMBODIMENT

Figure 1:
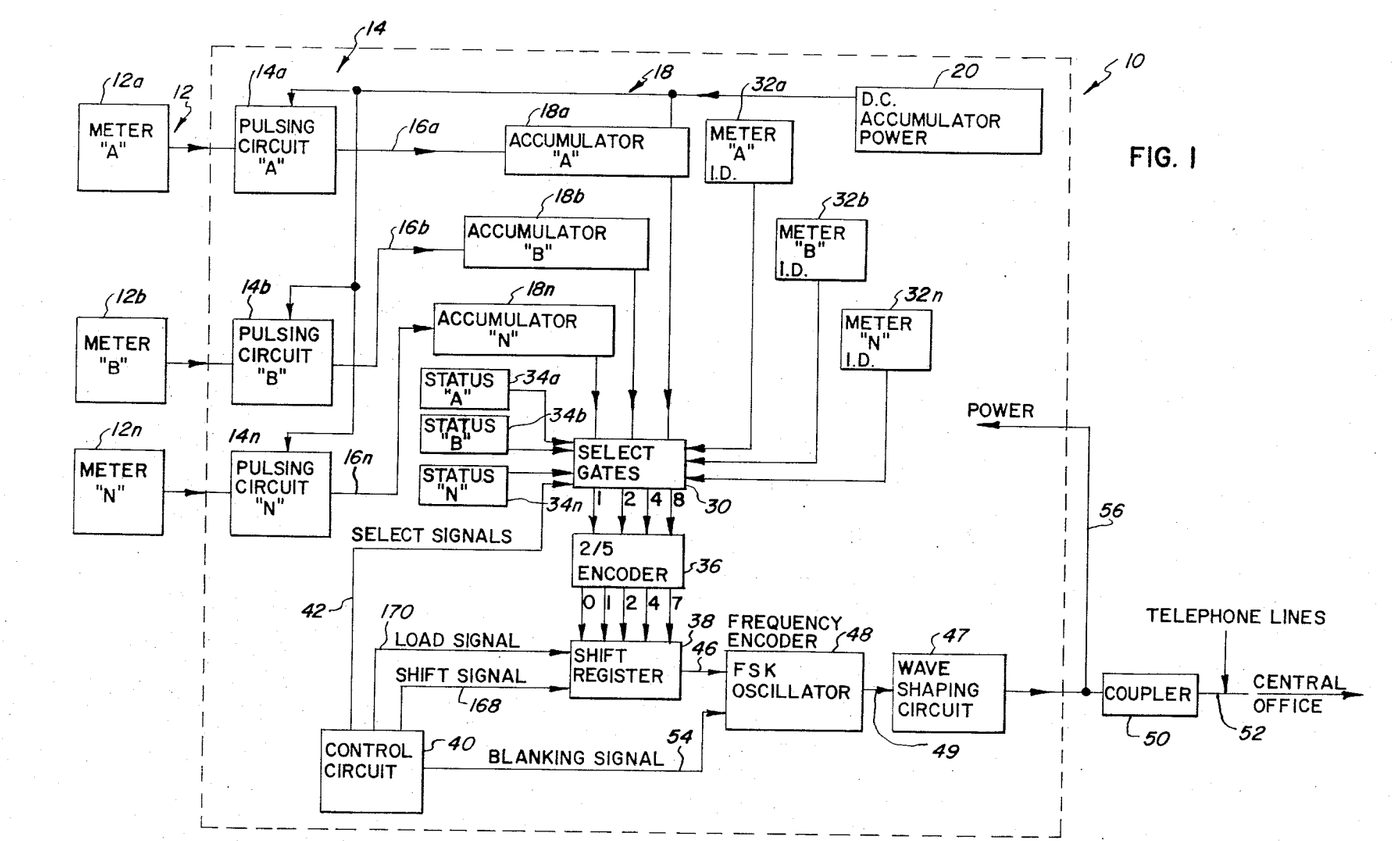
FIG. 1 is a block diagram of the apparatus for remotely reading a meter which comprises a preferred embodiment of the invention.

Referring now to the drawings wherein like reference characters designate like or corresponding parts throughout the several views, there is shown in FIG. 1, which illustrates a preferred embodiment, an apparatus 10 for reading, while in a central location, information contained on a plurality of meters 12, 12a .... 12n (where n is any positive integer). Meter 12a may represent a gas utility meter, and meter 12b may represent an electric utility meter and meter 12n may represent a water utility meter; however, it will be recognized by one skilled in the art that the disclosed invention is not limited to the reading of any one particular type or types of meters and may be used with any meter, either analogue or digital.

The apparatus 10 comprises a pulsing circuit 14 operably associated with each meter. For example, a pulsing circuit 14a is operably associated with meter 12a and a pulsing circuit 14b is operably associated with the meter 12b. The pulsing circuit 14 is used to convert the information being registered on the meter 12 into a series of electrical pulses. These series of electrical pulses are transmitted over a lead 16 to an accumulator 18.

An individual accumulator 18a, 18b and 18n is associated with each meter 12a, 12b and 12n, respectively. As pulse information signals are generated by the pulsing circuit 14, these signals are accumulated by the accumulator 18. The accumulator 18 receives electrical power from a DC power source 20. While not shown, the DC power source 20 is connected to each of the accumulators 18a, 18b, 18n. By using a DC power source, such as a battery, rather than an AC source, in the event of a power failure, the accumulator does not lose its accumulated count. If an AC source were utilized, and power failure did occur, the accumulator's count would go to zero, thereby losing all electronic information available from the meter. Each accumulator 18a, 18b and 18n in the preferred embodiment comprises a conventional binary coded decimal counter (hereinafter referred to as a BCD counter). However, any other type of counter may be utilized.

The accumulator 18 stores the information signals produced by the pulsing circuit 14 and produces a plurality of binary coded data bits which are indicative of the digital information registered on the meter 12.

An interrogating means or select gates 30 is provided to interrogate each of the accumulators 18a, 18b and 18n, thereby obtaining the accumulated information data bits from the accumulator 18. In addition to interrogating the accumulators, the interrogating means 30 is also adapted to receive information concerning the meter identification. This meter identification is schematically shown as numerals 32a, 32b and 32n. In addition, the interrogating means 30 may also be used to receive information as to the status of a particular switch. This switch status information is designated numerically as status information 34a, 34b and 34n. The status information 34 may be used to indicate whether an external switch is in the open or closed portion and can, therefore, be used to check the system for proper cathodic protection. For example, if proper cathodic protection is available, the switch may arbitrarily be chosen to be in its open position while if improper cathodic protection is available, the switch may then arbitrarily be in its closed position.

The output from the interrogating means or select gates 30 is fed to an encoder 36. The encoder 36 is an optional element and is used to encode the information data bits selected from the accumulator 18a, 18b or 18n by the select gates 30. The purpose of encoding the information data bits is to reduce the possibility of error in the transmission of this information to the central office. However, it will be recognized that if this added degree or reliability is not desired, the encoder 36 may be eliminated and the output of the interrogating means 30 may go directly to a conventional shift register 38. Both the shift register 38 and the interrogating means 30 are controlled by signals from a control circuit 40. The control circuit 40 provides a plurality of digit select signals to the interrogating means 30 over a series of leads numerically designated as 42. These digit select signals enable the interrogating means 30 to selectively interrogate any preselected accumulator 18a, 18b or 18n, as well as to receive information from the meter ID information 32 associated with the accumulator 18, as well as the status information from the status information 34 associated with each accumulator 18. In addition, the control circuit 40 also provides a load signal over a lead 170 and a shift signal over a lead 168 for the shift register 38. The load signal is used to load the shift register with the information data bits obtained from the interrogating means 30 and the optional encoder 36. The shift signal is used to shift this information out of the shift register 38 in serial form in a conventional manner.

The output 46 from the shift register is fed to a frequency encoder 48. The frequency encoder 48 may be a conventional FSK oscillator and converts the information data bits serially received from the shift register 38 to a frequency coded signal representative of the binary state of the information data bits received from the shift register 38. The frequency encoded signal from the frequency encoder 48 is then fed to a conventional wave shaping circuit 47 which converts the square wave output from the frequency encoder 48 into a sine wave. This sine wave signal is then transmitted to the central office through the use of a telephone coupler 50 over conventional telephone lines 52. The transmission of the signals from the frequency encloder 48 is also controlled by the control circuit 40 which produces a blanking signal over a lead designated as numeral 54. Power for the entire apparatus 10, with the exception of the accumulators 18a, 18b and 18n, may be provided over the telephone lines and may be a conventional power source. However, it will be recognized that the power to the apparatus 10 need not be provided by the telephone lines and may also be provided directly through any suitable power means.

Now, again referring to FIG. 1, the operation of the apparatus 10 will be described in further detail with reference to a single meter 12; however, it will be recognized that if a plurality of meters are to be read or monitored, the operation hereinafter described will automatically be repeated for each additional meter. To initiate the remote reading, the subscriber whose meter is to be read is automatically dialed from a central office telephone circuitry in a conventional manner. This information from the telephone central office is fed to the coupler 50 which is a conventional coupler supplied by the telephone company. The coupler 50 connects the apparatus 10 to the telephone lines 52 also supplying power for operation of the apparatus 10 as well as a link back to the central office for data transmission. Power is applied to the apparatus through a lead 56 from the coupler 50.

Figure 2:
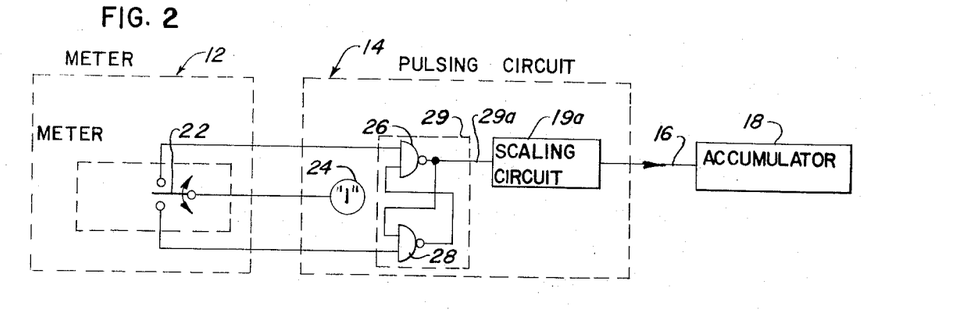
FIG. 2 is a block diagram of a pulsing circuit used in FIG. 1.

As mentioned previously, the meter 12 is constantly measuring information such as the amount of gas being consumed. As this information is being registered, the pulsing circuit 14 creates a plurality of information signals indicative of the information being registered on the meter. Referring now to FIG. 2, the pulsing circuit 14 is shown in greater detail. It will be understood by one skilled in the art that similar pulsing circuits may be utilized and that the pulsing circuit 14 shown in FIG. 2 is identical to the pulsing circuit 14a, 14b and 14n shown in FIG. 1. The pulsing circuit 14 comprises a switch 22 which may be directly connected to the shaft of the meter 14. The measurement appearing on the meter 14 is conventionally transmitted to the meter shaft. On the meter shaft is mounted a single dial or a plurality of dials containing the registered information. Thus, the rotation of the meter shaft is a direct indication of the quantity of information being registered on the meter itself. The switch 22 which is connected to the meter shaft is electrically connected to a source of power 24 which supplies a "1" bit of information each time a switch closure is made. A pair of gates 26 and 28 are provided which form an RS flip-flop circuit 29. The output of the RS flip-flop circuit 29 appears on the lead 29a and thus, for each closure of the switch 22, a pulse representing a switch closure appears on the lead 29a. Therefore, the closure of the switch 22 and its subsequent plurality of pulses is a direct indication of the amount of information being registered on the meter. This pulse information may then be directly transmitted to the accumulator 18.

In order to aid in the accumulating process, an optional scaling circuit 19 may be provided in the pulsing circuit 14. In the preferred embodiment, the scaling circuit 19a comprises a conventional divide by 50 counter. The divide by 50 counter is a series of six J-K flip-flops which are reset automatically after 50 pulses or 50 counts. The scaler 19 would, therefore, provide a single output pulse to the accumulator 18 representative of 50 switch closures. The number 50 has been selected since the shaft of one type conventional meter rotates 50 times for each digit of information registered on the meter and thus, each single pulse from the scaling circuit 19 would represent one digit of information appearing on the meter 12. However, it will be recognized that any number, even 1, may be used for scaling and that any conventional counter may be utilized as a scaling circuit 19a.

Figure 3:
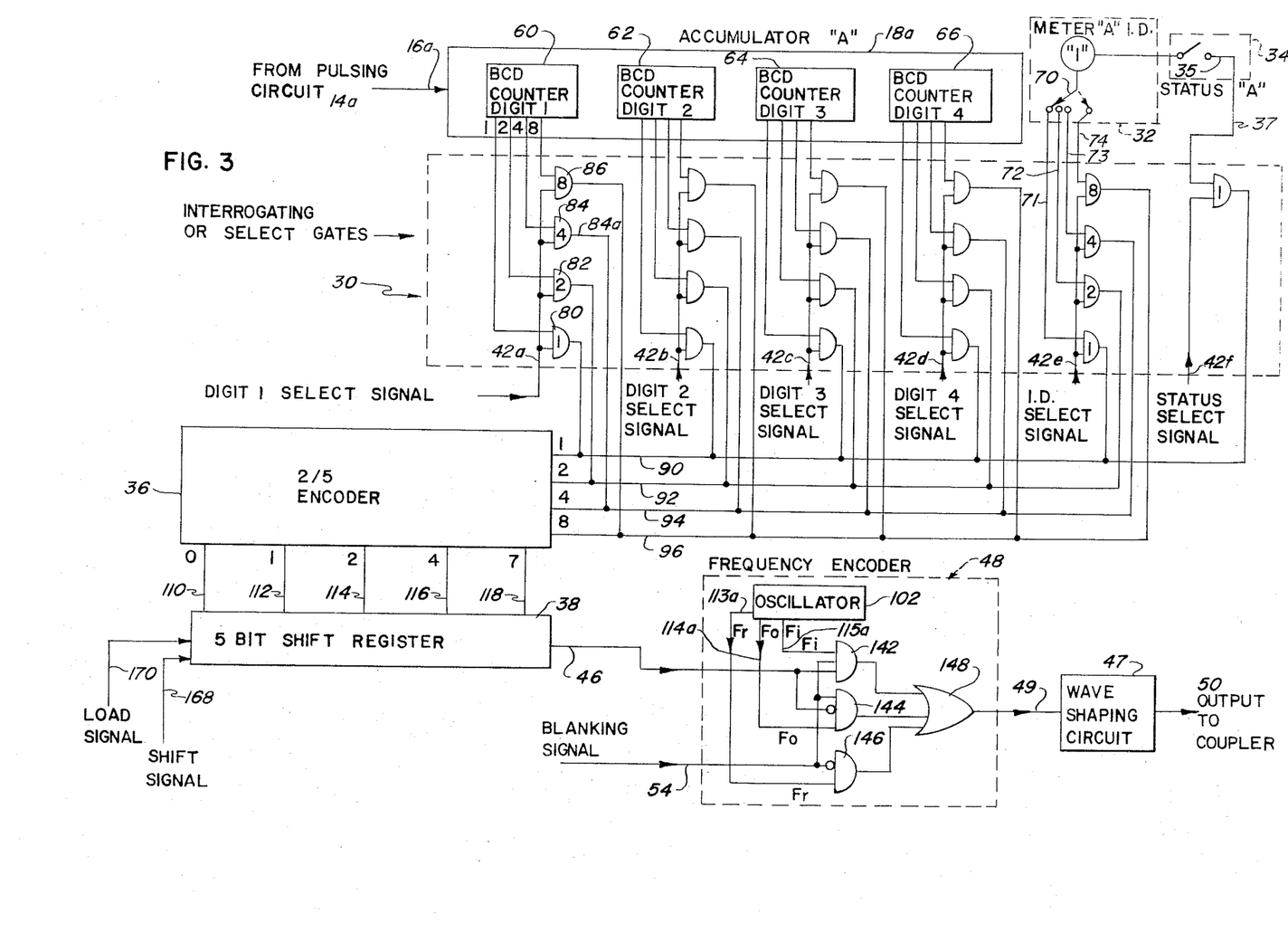
FIG. 3 is a more detailed block diagram showing a portion of the apparatus shown in FIG. 1.

As can be seen in FIG. 1, a pulsing circuit 14 is associated with each meter 12 and the output 16a from each pulsing circuit is fed to its own associated accumulator. Referring now to FIG. 3, the apparatus shown in FIG. 1 will be described in greater detail. For the sake of clarity, however, only one accumulator 18 is shown and it will be recognized that if more than one meter is being monitored, it will be necessary to utilize an additional accumulator for each meter. It will also be recognized that the interrogating means 30 only shows the select gates which are associated with a single accumulator and that if additional accumulators are utilized, additional select gates would also be required in the interrogating means 30.

As can be seen from FIG. 3, each accumulator in the preferred embodiment comprises a plurality of counters 60, 62, 64 and 66 and in the preferred embodiment, these counters are binary coded decimal counters. A binary coded decimal counter may be conventionally made from four J-K flip-flops which are designed to count to ten and then are reset. By making the counters count to ten rather than 16, as would be provided by four J-K flip-flops, each counter may then represent a single digit from the meter; for example, the counter 60 will represent the units digit, the counter 62 would represent the tens digit, the counter 64 would represent the hundreds digit, and the counter 66 would represent the thousandths digit. If the meter being read were to have more than four digits, it would then be necessary to add additional binary coded decimal counters. Furthermore, if it were desired to utilize fewer digits, similarly, fewer counters would be necessary. Also, it will be recognized by one skilled in the art that if the counters were to count to 16, fewer flip-flops would be required in the overall accumulator and a cost savings would be available; however, it would then not be possible to send one digit of information at a time as will be hereinafter described. However, if this feature is not desired, counters may count to 16 rather than 10. As each pulse from the pulsing circuit 14 appears at the input to the accumulator 18, a pulse of information is placed into the first counter 60. The binary coded decimal counter 60 then converts the pulse into a binary number. This information is maintained in the counter 60 until the next pulse advances the counter. For example, if the meter 12a were to measure "four" units of gas, the shaft would rotate 200 times thereby causing 200 closures of the switch 22 in FIG. 2. The scaling circuit 19 would convert these 200 switch closures into four pulses and would place a reading of four into the accumulator 18. This would put a reading in terms of binary data bits of information of 0010 in the counter 60. The counters 62, 64 and 66 would all have readings of 0000. Similarly, if the meter 12 were to register a reading of 4,000 units consumed, binary data bits corresponding to the number of 4,000 would be present in accumulator 18. This would be registered by having a 0010 reading in counter 66 and 0000 readings in the remaining counters.

The meter ID information 32 will now be explained with reference to FIG. 3. Each meter which is to be remotely read is assigned a number. This number can be from one to 16 in the preferred embodiment; however, as will be seen later, any other number may be utilized by supplying additional select gates for the interrogating means 30. The purpose of the meter ID information 32 is to allow the reader in the central office to know which meter is being remotely monitored or read. The meter number is placed into the apparatus 10 through the use of diodes or straps 70. The straps or diodes 70 are set up such that data information in binary form is placed on the input lead to the interrogating means. These leads are designated as leads 71, 72, 73 and 74. If the meter were to have the number one associated with it, the strap 70 would be connected to the lead 71, thereby providing one binary bit of information. However, if the meter were to use the number eight, then the strap 70 would only be connected to the lead 74, as shown by the dotted line. Similarly, a status information reading 34 may also be obtained. The system will be able to tell whether or not the switch 35 is in its open or closed position. When in its open position, the output lead 37 would have a zero bit of information while, when in the closed position, a one bit of information. Arbitrarily an open switch may indicate inadequate cathodic protection while a closed switch may indicate adequate cathodic protection. Similarly, the switch identification can be used for any other purpose. It will be recognized by one skilled in the art that the meter ID information 32 and the status information 34 are optional and may be eliminated. It will also be recognized that a single meter ID information circuit 32 may replace the plurality of meter ID information circuits 32a, 32b, . . . 32n.

As shown in FIG. 1, the output from the accumulator 18 goes into the input of an interrogating means 30. The interrogating means 30 is a conventional means for interrogating a counter and comprises a plurality of select gates. As shown in FIG. 3, four select gates are associated with each binary counter in the accumulator. For ease of explanation, only the process of selecting the data bits from the single counter 60 will be described; however, the remaining select gates operate in an identical fashion in order to obtain the data bits of information from the counters 62, 64 and 66.

When it is desired to interrogate the counter 60, a digit 1 select signal is transmitted from the control circuit 40 (FIGS. 1 and 7) via the lead 42. This places a signal on one lead of each of the select gates 80, 82, 84 and 86 associated with the counter 60. Because the gates 80, 82 84 and 86 are AND gates, a signal will be present on their output if there is a signal present on both leads of their input. Since the digit select signal for one supplied by the control circuit 40 is present on one of the leads, any information present in the counter 60 will then appear on the output of the gates 80, 82, 84 and 86. Again using the example of the number four or, namely, 0010 in the counter 60, an output will only appear on the output lead 84a of the gate 84. This output thereby represents the number four in binary fashion. This binary coded data bit of information is then present on the input lead 94 to the encoder 36. If a signal were also present on any of the other output leads of the select gates, these signals would also be present on the input to the encoder 36. Only one encoder is used for the entire apparatus regardless of the number of meters. As mentioned previously, the use of an encoder 36 improves the reliability of the system. However, it may be eliminated and, in that case, the output from each of the select gates would go directly to the input of the shift register 38.

Figure 4:
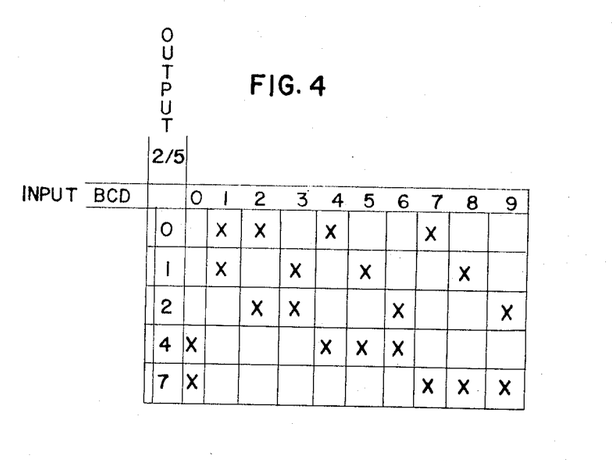
FIG. 4 is a chart showing a two/five code.

In the preferred embodiment, a 2/5 encoder has been utilized. This sequence of coding is conventional and is shown in FIG. 4. If the number four were present on the input of the encoder 36, referring to FIG. 4, it can be seen that when it is decoded in a 2/5 manner, the output would be 10010. In a like manner, if the number three were present on the input of the encoder 36, then the output would be 01100. The output from the encoder 36 appears on the five leads numerically designated 110, 112, 114, 116 and 118 and these leads then go to the input of the shift register 38.

Figure 5:
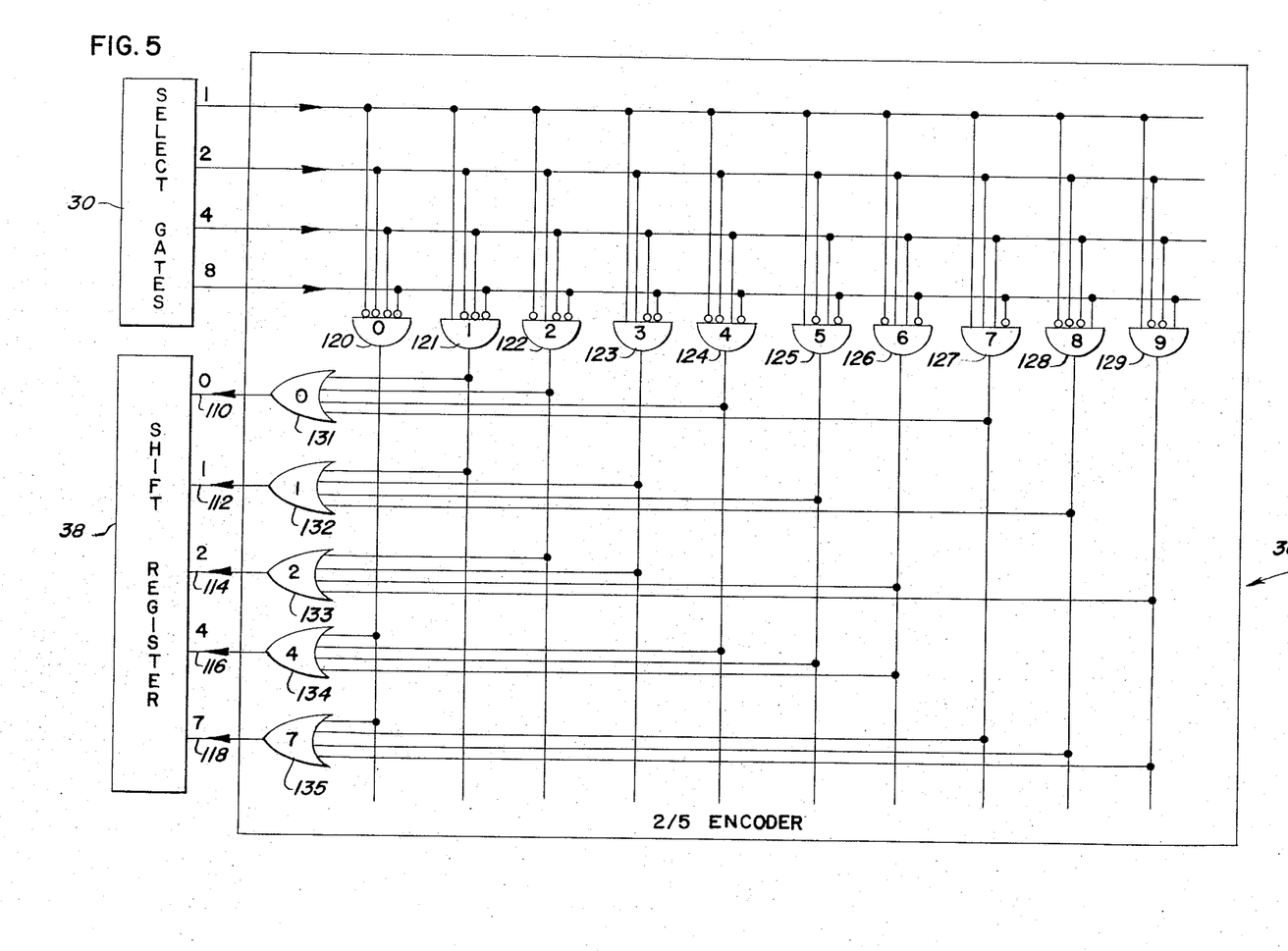
FIG. 5 is a schematic diagram showng one method for constructing a two/five encoder shown in FIG. 1.

Referring to FIG. 5, a 2/5 encoder is shown. This is one conventional method for manufacturing a 2/5 encoder and it will be recognized by one skilled in the art that other similar methods may be utilized. As can be seen in FIG. 5, ten gates are designated as numbers 120 through 129. Again using the example of the number four or 0010 in the counter 60, it will be seen that a signal would appear only on the lead 94 and this would create a signal on the output of gate 124 since all the remaining gates are inhibited. If the number eight were present in the counter 60, a signal would appear only on the lead 96 and then an output signal would only appear on the gate 128. Five OR gates 131 through 135 are connected to the outputs of the AND gates 120 through 129. The methods of connection are in accordance with the coding chart shown in FIG. 4. Thus, for an output on the gate 124, it is desired that the coded number 10010 be present on the input leads 110, 112, 114, 116 and 118 to the shift register 38. Thus, the input to the gate 131 and the gate 134 are the only gates connected to the output of gate 124. Since the number eight in the 2/5 coding would be represented by 01001, the output from the gate 128 would be connected to the input of the gates 132 and 135.

By studying the chart shown in FIG. 4, the advantages of the 2/5 coding system will be readily appreciated for every output data bit of information in the counter, the corresponding information appearing on the output of the encoder 36 will always contain two 1 bits and three 0 bits and thus a parity check may be made and, if any number being transmitted contains any other number of ones and zeros, an error will be recognized and the accumulator can again be interrogated.

Once the information has been interrogated from the accumulator 18 by the interrogator 30 and has been encoded by the 2/5 encoder, the information appearing on the leads 110, 112, 114, 116 and 118 is then ready to be fed into the shift register 38. This shift register 38 is a conventional five-bit shift register and the information may be loaded into it by the application of a load signal from the control circuit 40 via a lead 170. As will be described below, the load signal may be the OR of the reset signal and the "next digit signal". After this information has been loaded into the shift register 38, it may then be serially shifted out one bit of information at a time into the frequency encoder 48. As mentioned previously, the frequency encoder 48 comprises a conventional FSK oscillator. Again assuming the number four is present in the counter 60, the information loaded into the shift register 38 would be 10010. Thus, upon the application of a shift signal from the control circuit 40, the zero bit coming from the lead 118 would be shifted out from the shift register 38 onto the output lead 46. It would take five shift signals to shift out all five bits of information from the shift register 38. If a different code were utilized which would have more than five bits of information for each digit, it would then be necessary to utilize a larger shift register. Simultaneously with placing a load signal into the shift register 38, the digit 1 select signal on lead 42 to the interrogating means 30 is removed.

The purpose for placing the information from the shift register 38 into the frequency encoder 48 is to convert the output data bits from the shift register 38 into a frequency coded signal wherein the frequency signal is representative of the magnitude of each of the output data bits. For example, a rest frequency, $f_{rest}$, for the FSK oscillator 48 is determined and then two other frequencies, lower than the rest frequencies, are also determined arbitrarily. The first frequency, designated as $f_1$, is the frequency of signal that will be transmitted if a one bit of information were present at the input to the FSK oscillator 48, while the second frequency $f_0$ would be used to designate a zero bit of information being present on the input lead 46 to the FSK oscillator 48.

Figure 6:
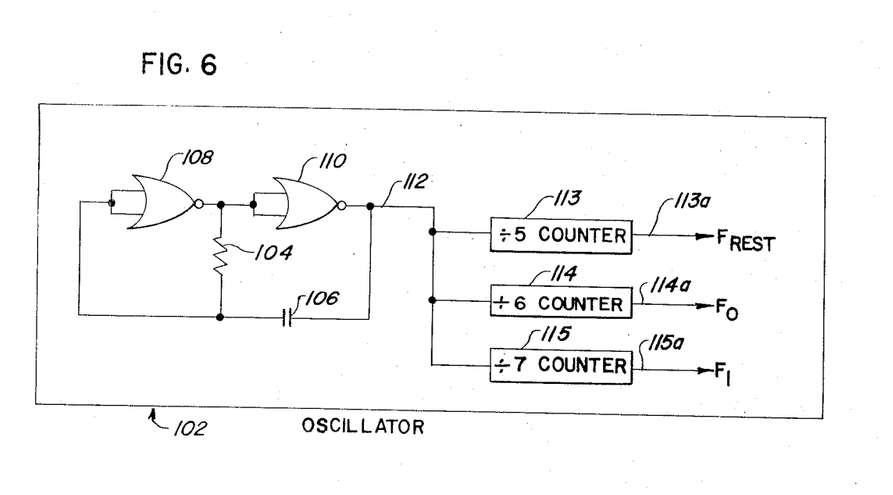
FIG. 6 is a block diagram of an oscillator shown in FIG. 3.

The FSK oscillator 48 comprises a conventional oscillator 102. The conventional oscillator 102 is shown in greater detail in FIG. 6 and may comprise a simple RC circuit utilizing a single resistor 104 and a single capacitor 106 with two inhibit gates 108 and 110. The frequency produced at the output 112 from the circuit is then transmitted to three counters 113, 114 and 115 which produce the $f_{rest}$, $f_0$ and $f_1$ frequencies. The $f_{rest}$ frequency is determined by the capacitor 106 and the resistor 104. If the output on lead 112 is arbitrarily determined to be 10 kc, and assuming that the counter 113 is a divide by five counter, the $f_{rest}$ will arbitrarily be made 2 kc. The only requirements for the frequencies $f_1$ and $f_0$ are that they be a fraction of the frequency for $f_{rest}$ but should not be exact multiples thereof. Therefore, a divide by six counter 114 and a divide by seven counter 115 were used. In this manner, the $f_0$ frequency will be 5/6 of the $f_{rest}$ frequency and the $f_1$ frequency will be 5/7 of the $f_{rest}$ frequency. Again referring to FIG. 3, the three frequencies from the oscillator 102 are placed on the respective inputs of three gates 142, 144 and 146. The frequencies $f_0$, $f_{rest}$ and $f_1$ are all determined to be within the telephone frequency response since the frequencies are going to be transmitted to the central office via the telephone lines. However, if it were desired to utilize radio transmission, different frequencies may be employed.

To start the frequency coding, a zero blanking signal is supplied from the control circuit 40 via the lead 54. The zero blanking signal causes an output from the gate 146 which causes a transmission of the signal having the frequency $f_{rest}$ which is then transmitted to the coupler 50 via the lead 49 and the wave shaping circuit 47. The control circuit 40 then produces a one blanking signal which would then cause an output from either gate 142 or 144, depending upon the information on the input from the shift register 38 via the input lead 46. If the information from the shift register is a 1, then there would be an output on the gate 142 which would produce a signal having the frequency $f_1$ which would be transmitted to the coupler 50. If the information from the shift register is a zero, then there would be an output from the gate 144 which would cause a signal to be transmitted having the frequency $f_0$. For example, again assuming that the digit four was in the BCD counter 60, the 2/5 encoder would produce the following bits of information, 10010. Thus, the shift register, upon receiving a shift signal from the control circuit 40, would first shift out a zero. This would thus cause a signal on the output of the gate 144 having a frequency of $f_0$. After a zero blanking signal is produced which would produce a signal having the frequency of $f_{rest}$ from the gate 146, another one blanking signal is introduced into the frequency encoder 48. The next encoded bit of information is a 1 from the shift register 38 and this would then produce an output on the gate 142 and the output signal would have a frequency of $f_1$. After another zero blanking signal causing the production of a signal having the frequency $f_{rest}$, another zero would be shifted out of the shift register 38 causing a signal of frequency $f_0$ to be transmitted by the gate 144. Similarly, when the fourth bit of information, i.e., a 1, is shifted out of the shift register 38, a signal having the frequency $f_1$ would appear on the output of gate 142. Lastly, the shift register would shift out another zero causing a signal of frequency $f_0$ to be transmitted by the gate 144. Thus, it can be seen that the frequency encoder 48 encodes each of the binary data bits contained in the shift register 38 into a frequency coded signal wherein the frequency of this signal is representative of the binary state of each of the bits of information.

After all information has been shifted from the shift register 38, a digit 2 select signal is then sent to the select gates 38 thereby placing the information contained in binary counter 62 into the 2/5 encoder 36. This information is then encoded and loaded into the shift register 38 upon command by the load signal. As described before, the encoded data bits are then serially shifted out into the frequency encoder 48 where they are converted to a frequency responsive signal. This continues until the four counters in the accumulator 18a have been interrogated.

Next, an ID select signal from the control circuit 40 is placed on the select gates 30, thus interrogating the meter identification information 32. Assuming that the meter has been identified previously as meter No. 1 through the use of the strap 70, an output would appear on the lead 90 to the input of the encoder 36. This number 1, referring to FIG. 4, is encoded as 11000 and thus, these numbers would appear on the leads 110, 112, 114, 116 and 118, respectively. This information is then treated like the previous information which had been interrogated from the counters 60 through 66 and is then frequency encoded and transmitted to the central office. Next, a status select signal is then placed on the interrogating means 30, thereby seeing whether or not a 1 is present on the input of the select gate associated with the status information 34. If the switch 35 were open, no signal would be present and thus, a zero would be placed into the 2/5 encoder 36. However, if the switch 35 were closed, then a 1 would be placed on the input of the 2/5 encoder 36. Whichever information is placed in the encoder, it is subsequently encoded in accordance with FIG. 4, and is then placed in the shift register. After these encoded bits of information are placed into the shift register, they are serially shifted out to the frequency encoder 48 and then the frequency encoded signals are transmitted to the central office.

This completes the interrogation of all information concerned with meter 12a. If a meter 12b is also to be monitored, the control circuit would then send a select signal to the select gates 30 which begin interrogating the accumulator 18b associated with the meter 12b. After this accumulator 18b has been interrogated, then the meter 12b identification 32b and the status information identification 34b are subsequently interrogated in a similar manner. This sequence continues until all meters have been remotely read.

Figure 7:
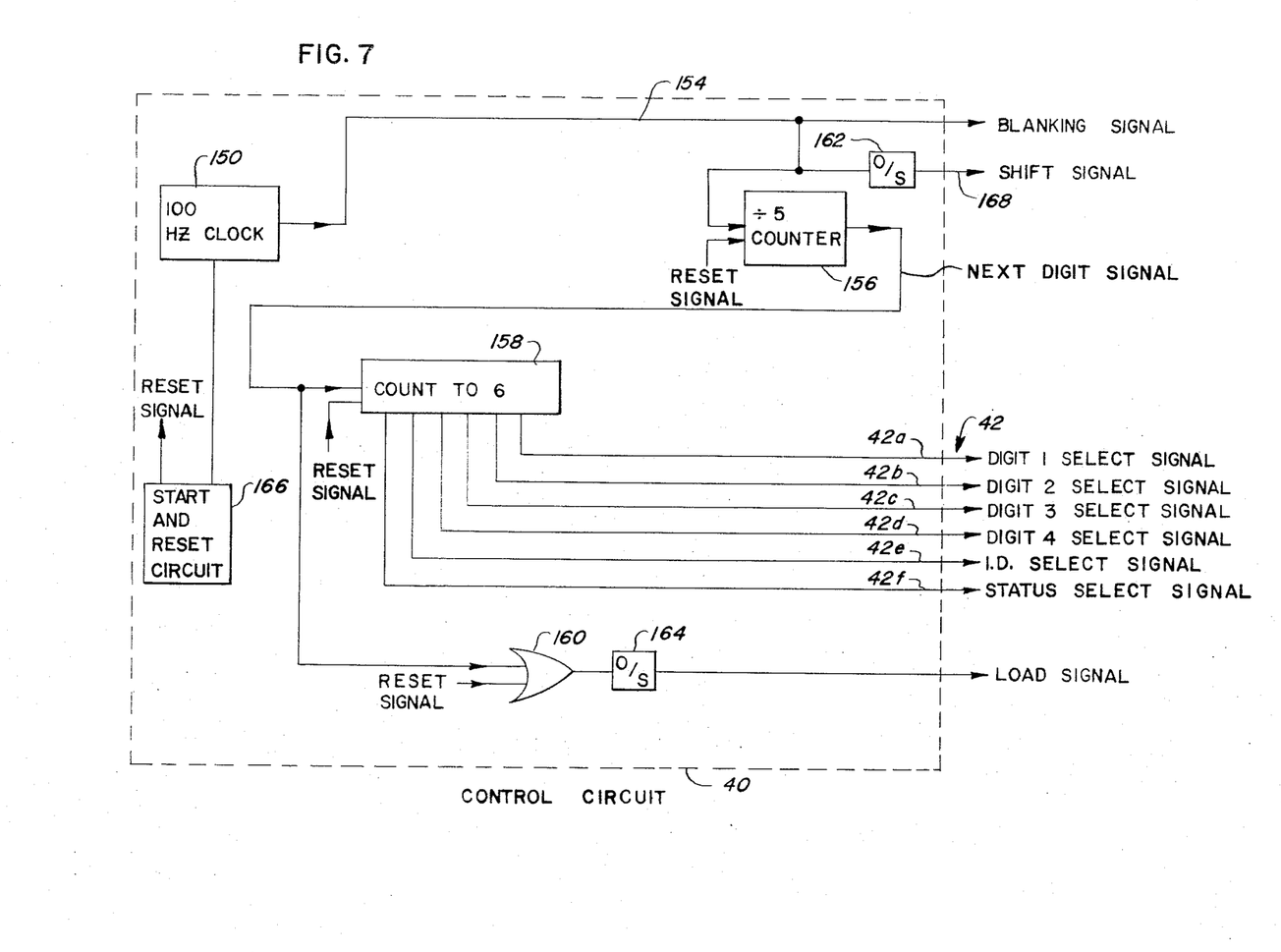
FIG. 7 is a block diagram of a control circuit shown in FIG. 1.

Referring now to FIG. 7, the control circuit 40 will be described. The description of the control circuit 40 will clearly show how the select signals, the load signals, the shift signals and the blanking signals are produced. The control circuit 40 comprises a clock circuit 150, a counter 156, a counter 158, an OR gate 160, and two multivibrators 162 and 164. In addition, a start and reset circuit 166 is provided. When it is desired to interrogate the meters, at the start of the sequence of operation, a start signal is transmitted from the central office to the start and reset circuit. This start signal causes the start and reset circuit 166 to energize the clock 150 and to also reset the counter 156 and the counter 158. The counter 156 is set to zero and the counter 158 is set such that the digit 1 select signal is produced. Counter 156 is a conventional divide by five counter while the counter 158 is a conventional counter which is set to count to six. The multi-vibrators 162 and 164 are each one shot monostable multi-vibrators and are conventional. As mentioned previously, the start and reset circuit 166 sets the counter 158 initially such that a digit 1 select signal is produced. This also causes a load signal to be produced from the output of the monostable multi-vibrator 164 through the OR gate 160. The production of the digit 1 select signal is transmitted to the interrogating means 30 and causes the first digit to be interrogated from the counter 60. A very short time later, the load signal from the multi-vibrator 164 is transmitted to the shift register 38 and causes the encoded signal from the counter 60 to be placed into the shift register 38. At this time, since the blanking signal is zero, a zero blanking signal is produced on the lead 54 which goes to the frequency encoder 48 (see FIGS. 1 and 3). When the next clock pulse is produced, the state of the blanking signal goes from zero to 1 and this causes a one blanking signal to be produced on the lead 54 which is transmitted to the frequency encoder 48 and causes a signal of either $f_0$ or $f_1$ to be produced. The next clock pulse causes the blanking signal to again go back to zero and also causes a shift signal to be produced on the lead 168 which is transmitted to the shift register 38 (FIGS. 1 and 3). This shift signal then causes the shift register 38 to shift out the next bit of information to the frequency encoder 48. Since the blanking signal was again set to zero, simultaneously with the production of the shift signal, another zero blanking signal is produced on the lead 54. This zero blanking signal causes a signal of the frequency $f_{rest}$ to be produced by the frequency encoder 48. This same sequence continues until four shift signals are produced and five one blanking signals are produced. When this occurrence is counted by the counter 156, the output produces another load signal on the lead 170 and the counter 158 then causes a digit 2 select signed to be produced on the lead 42b. The production of the digit 2 select signal on the lead 42b causes the interrogating means 30 to interrogate the counter 62. This information is then encoded by the encoder 36 and is loaded into the shift register 38 because of the production of the load signal on the lead 170. After this occurs, the sequential zero blanking signal and one blanking signal as well as the shift signals are produced in the manner described above. This process continues until all meters have been read.

In summary, the control circuit 40 produces the followng sequential signal from the start: digit 1 select signal, zero blanking signal, one blanking signal, zero blanking signal, shift signal, one blanking signal, zero blanking signal, shift signal, one blanking signal, zero blanking signal, shift signal, one blanking signal, zero blanking signal, shift signal, one blanking signal, zero blanking signal, digit 2 select signal, etc.

In summary, the apparatus 10 described above will read a meter 12a remotely as follows: Assuming that the meter 12a contains a reading of four, the counter 60 will contain the number four, the counters 62, 64 and 66 will each contain the number zero. To read this information, power is transmitted from the central office via the telephone lines 52 through the coupler 50 to the apparatus 10. The control circuit 40 produces a digit 1 select signal on the lead 42a which takes the number four in binary form as 0010 from the counter 60 and places it into the encoder 36. The encoder 36 encodes the binary number four into a 10010 code and this is placed into the shift register 38 as a result of the production of a load signal on the lead 170 by the control circuit 40. As shift signals are produced on the lead 168, by the control circuit 40, the shift register 38 serially shifts out this information and shifts it into the frequency encoder 48 which encodes each of the data bits of information into a frequency signal representative of the binary state of the information contained in the shift register which is being serially shifted out. Each time a one blanking signal is produced by the control circuit 40, a signal having the frequency of either $f_0$ or $f_1$ will be produced representing the encoded bit of information. In between these signals, a signal of frequency $f_{rest}$ will be produced whenever a zero blanking signal is transmitted by the control circuit 40 on the lead 54 and thus, for the number four or the encoded number 10010, the first data bit that will be shifted out by the shift register 38 is a zero. The second bit of information is a one, then a zero, then a zero, and then a one. The output of the frequency encoder 48 would thus be as follows: $f_{rest}, f_0, f_{rest}, f_1, f_{rest}, f_0, f_{rest}, f_0, f_{rest}, f_1, f_{rest}$. At this point, the counter 158 of the control circuit would then produce a digit 2 select signal and the counter 62 of the accumulator 18a would then be interrogated by the interrogating means 30. Since the counter 62 contained a zero information, 0000 will be placed into the encoder 36 which will then put a 00011 into the shift register 38. This information is then converted by frequency encoder 48 in a similar manner. After the accumulator 18a has been interrogated, as well as the meter identification 32 and the status identification 34, accumulator 18b will then be interrogated.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. An apparatus for reading, while at a central location, a meter containing information which is located at a station remote from said central location, comprising:
   a means for producing a plurality of information signals indicative of the information being registered on said meter;
   a counter means for accumulating said information signals and for converting said information into data indicative of the total information which is registered on said meter;
   a battery power source connected to said counter means wherein said counter means maintains said accumulated information in the event of a loss of conventional power;
   a remotely initiated selecting means for interrogating said counter means wherein said selecting means provides a plurality of individual output data bits each of which is representative of one of the digits of information registered on said meter and contained within said counter means;
   a first encoding means for converting said output data bits into coded output data bits wherein said coded output data bits have a predetermined characteristic whereby a parity check of said information may be made;
   shift register means connected to receive said coded data bits and to serially shift out said coded data bits;
   a second encoding means for converting each of said coded output data bits into a frequency coded signal wherein the frequency of the signal from said second encoding means is representative of the magnitude of each of said coded output data bits; and
   a means for sequentially transmitting each of said frequency coded signals to said central location thereby enabling each of said digits of information registered on said meter to be read.

2. The apparatus of claim 1 wherein said counter means comprises a plurality of counters.

3. The apparatus of claim 1 wherein said counter means comprises a plurality of binary coded decimal counters and wherein one of said counters is provided for each digit of information available to be read on said meter.

4. An apparatus for reading, while at a central location, a meter containing information which is located at a station remote from said central location, comprising:
- a means for producing a plurality of pulse information signals indicative of the information being registered on said meter;
- a plurality of binary coded decimal counter means to accumulate said pulse information signals and to convert said accumulated information signals into a plurality of binary data bits indicative of the total information which is registered on said meter;
- a battery power source connected to said plurality of binary counter means wherein said counter means maintain said accumulated information in the event of a loss of conventional power;
- a first encoding means for converting said binary data bits into coded output data bits wherein said coded output data bits have a predetermined characteristic whereby a parity check of said information may be made;
- a shift register means connected to receive said coded data bits and to serially shift out said coded data bits;
- gate means for selectively transferring said binary data bits from any one of said counter means to said first encoding means;
- control means for actuating said gate means to transfer said selected coded data bits into said shift register means and then causing said shift register means to serially shift out said transferred coded data bits;
- an oscillator means connected to the output of said shift register means to convert each of said serially shifted out transferred coded data bits into a frequency coded signal wherein the frequency is representative of the binary state of each of said bits; and
- a means for sequentially transmitting each of said frequency coded signals to said central office location.

5. The apparatus of claim 4 wherein said pulse producing means comprises:
- a switch means connected to the shaft of said meter means; and
- a flip-flop circuit means connected to said switch means wherein said flip-flop circuit means produces a plurality of pulse signals representative of the number of rotations of said meter shaft thereby being indicative of the information being registered on said meter.

6. The apparatus of claim 5 wherein said pulse producing means further comprises:
- a means for scaling the output of said flip-flop circuit means wherein one of said pulse signals is produced for a preselected number of rotations of said shaft.

7. The apparatus of claim 4 wherein one binary coded decimal counter is provided for each digit of information which is available to be read on said meter.

8. The apparatus of claim 7 wherein said control means first transfers to said shift register means said coded output data bits representative of said binary data bits stored in a preselected first one of said counters and transfers said coded output data bits representative of said binary data bits stored in a preselected second one of said counters only after said coded data bits from said first counter have been shifted out by said shift register means.

9. The apparatus of claim 4 further comprising:
- a means for remotely identifying the meter being read.

10. The apparatus of claim 9 further comprising an indicator switch associated with said meter and a means for remotely determining whether said indicator switch is in an open or closed condition.

11. The apparatus of claim 4 wherein said oscillator means comprises a frequency shift keying oscillator.

12. The apparatus of claim 11 wherein said frequency coded signals are transmitted to said central office by a telephone transmitting means.

13. The apparatus of claim 11 wherein said frequency coded signals are transmitted to said central office by a radio transmitting means.

14. An apparatus for reading, while at a central location, a plurality of meters each containing information which is located at a station remote from said central location, comprising:
- a means associated with each meter for producing a plurality of information signals indicative of the information being registered on said meter;
- a counter means associated with each meter for accumulating said information signals and for converting said information into data which is indicative of the total information which is registered on said associated meter;
- a battery power source connected to said counter means wherein said counter means maintains said accumulated information in the event of a loss of conventional power;
- a remotely initiated selecting means for interrogating a preselected one of said counter means wherein said selecting means provides a plurality of individual output data bits each of which is representative of one of the digits of information registered on said preselected meter and contained within said preselected counter means;
- a first encoding means for converting said output data bits into coded output data bits wherein said coded output data bits have a predetermined characteristic whereby a parity check of said information may be made;
- shift register means connected to receive said coded data bits and to serially shift out said coded data bits;
- a second encoding means for converting each of said output data bits into a frequency coded signal wherein the frequency of the signal from said second encoding means is representative of the magnitude of each of said coded output data bits; and
- a means for sequentially transmitting each of said frequency coded signals to said central location thereby enabling each of said digits of information registered on said preselected meter to be read.

15. An apparatus for reading, while at a central location, a plurality of meters each containing information which is located at a station remote from said central location, comprising:
- a means associated with each meter for producing a plurality of pulse information signals indicative of the information being registered on said meter;
- a plurality of binary coded decimal counter means associated with each meter adapted to accumulate said pulse information signals and to convert said accumulated information signals into a plurality of binary data bits indicative of the total information which is registered on said meter;

a battery power source connected to said plurality of binary counter means wherein said counter means maintain said accumulated information in the event of a loss of conventional power;

a first encoding means for converting said binary data bits into coded output data bits wherein said coded output data bits have a predetermined characteristic whereby a parity check of said information may be made;

a shift register means connected to receive said coded data bits from the counter means associated with a preselected one of said meters and then causing said shift register to serially shift out said coded data bits;

gate means for selectively transferring said binary data bits from any one of said counter means to said first encoding means;

control means for actuating said gate means to transfer said selected coded data bits into said shift register means and then causing said shift register means to serially shift out said transferred coded data bits;

an oscillator means connected to the output of said shift register means to convert each of said serially shifted out transferred coded data bits into a frequency coded signal wherein the frequency is representative of the binary state of each of said bits; and a means for sequentially transmitting each of said frequency coded signals to said central office location.

* * * * *

UNITED STATES PATENT OFFICE
CERTIFICATE OF CORRECTION

Patent No. 3,786,423    Dated Jan. 15, 1974

Inventor(s) Dennis J. Martell

It is certified that error appears in the above-identified patent and that said Letters Patent are hereby corrected as shown below:

Column 3, line 36, "portion" should be --position--.
Column 4, line 19, "encloder" should be --encoder--.
Column 6, line 9, after "of" the word "four" should be --"four"--.
Column 6, lines 14 and 15, after "of" the number "4,000" should be --"4,000"--.
Column 6, line 33, after "number" the word "one" should be --"one"--.
Column 6, line 36, after "number" the word "eight should be --"eight"--.
Column 6, line 43, after "a" the word "one" should be --"one"--.
Column 7, line 6, the first "one" should be --"one"--.
Column 7, line 9, after "number" the word "four" should be --"four"--.
Column 7, line 12, after "number" the word "four" should be --"four"--.
Column 7, line 26, after "number" the word "four" should be --"four"--.
Column 7, line 31, the word "three" should be --"three"--.
Column 7, line 42, the word "four" should be --"four"--.
Column 7, line 45, after "number" the word "eight" should be --"eight"--.
Column 7, line 57, after "number" the word "eight" should be --"eight"--.
Column 7, line 64, after "two" the number "1" should be --"1"--.
Column 7, line 65, after "three" the number "0" should be --"0"--.
Column 7, line 67, the words "ones" and "zeros" should be --"ones"-- and --"zeros"--.
Column 8, line 11, "OR" should be --"OR"--.
Column 8, line 18, the word "four" should be --"four"--.
Column 8, line 41, the word "one" should be --"one"--.
Column 8, line 43, the word "zero" should be --"zero"--.
Column 9, line 6, the word "zero" should be --"zero"--.
Column 9, line 8, the word "zero" should be --"zero"--.
Column 9, line 12, the word "one" should be --"one"--.

UNITED STATES PATENT OFFICE
CERTIFICATE OF CORRECTION

Patent No. 3,786,423      Dated Jan. 15, 1974

Inventor(s) Dennis J. Martell      Page - 2

It is certified that error appears in the above-identified patent and that said Letters Patent are hereby corrected as shown below:

Column 9, line 16, the number "1" should be --"1"--.
Column 9, line 20, the word "zero" should be --"zero"--.
Column 9, line 23, the word "four" should be --"four"--.
Column 9, line 33, the number "1" should be --"1"--.
Column 9, line 36, the word "zero" should be --"zero"--.
Column 9, line 37, the word "zero" should be --"zero"--.
Column 9, line 40, the number "1" should be --"1"--.
Column 9, line 43, the word "zero" should be --"zero"--.
Column 10, after "number" (line 1), the number "1" should be --"1"--.
Column 10, line 9, the number "1" should be --"1"--.
Column 10, line 13, the number "1" should be --"1"--.
Column 10, line 63, after "a" the word "zero" should be --"zero"--.
Column 10, line 67, the word "one" should be --"one"--.
Column 11, line 10, the word "zero" should be --"zero"--.
Column 11, line 11, the word "zero" should be --"zero"--.
Column 11, line 15, the word "one" should be --"one"--.
Column 11, line 25, the words "zero" and "one" should be --"zero"-- and --"one"--.

Column 11, line 39, the word "four" should be --"four"--.
Column 11, line 40, the word "four" should be --"four"--.
Column 11, line 41, the word "zero" should be --"zero"--.
Column 11, line 46, the word "four" should be --"four"--.
Column 11, line 48, the word "four" should be --"four"--.
Column 11, line 58, the word "one" should be --"one"--.
Column 11, line 62, the word "zero" should be --"zero"--.
Column 11, line 64, the word "four" should be --"four"--.
Column 12, line 7, the word "zero" should be --"zero"--.

Signed and sealed this 17th day of September 1974.

(SEAL)
Attest:

McCOY M. GIBSON JR.
Attesting Officer

C. MARSHALL DANN
Commissioner of Patents